United States Patent [19]

Tsukada et al.

[11] Patent Number: 5,296,340
[45] Date of Patent: Mar. 22, 1994

[54] DECORATIVE SHEET AND PROCESS FOR PREPARATION THEREOF

[75] Inventors: Masaki Tsukada; Osamu Takeko; Yoshiharu Horie; Tomio Doi; Norinaga Nakamura; Kenshi Shimizu, all of Tokyo, Japan

[73] Assignee: Dai Nippon Insatsu Kabushiki Kaisha, Japan

[21] Appl. No.: 582,845

[22] PCT Filed: Feb. 20, 1990

[86] PCT No.: PCT/JP90/00196
§ 371 Date: Dec. 20, 1990
§ 102(e) Date: Dec. 20, 1990

[87] PCT Pub. No.: WO90/09282
PCT Pub. Date: Aug. 23, 1990

[30] Foreign Application Priority Data

Feb. 20, 1989 [JP] Japan .................... 1-40049
Aug. 1, 1989 [JP] Japan .................... 1-19929

[51] Int. Cl.⁵ ............ G03C 5/00; B32B 31/00
[52] U.S. Cl. .................... 430/394; 430/904; 156/196; 156/209; 156/219; 156/244.16; 156/272.2; 156/273.3; 156/273.5; 156/275.5; 156/277; 427/271; 427/369; 427/372.2; 427/504; 427/521; 101/487; 101/490

[58] Field of Search ............ 428/156, 167, 172, 195, 428/201, 203, 204, 206, 207, 542.2; 156/196, 209, 272.2, 176, 273.7, 219, , 244.16, 58, 273.3, 273.5, 277, 275.5; 430/9, 14, 394, 904, 487, 490; 101/487, 490; 427/35, 38, 43.1, 44, 331, 369, 372.2

[56] References Cited

U.S. PATENT DOCUMENTS 4,117,181  9/1978  Minami et al. .......... 428/138
4,499,126  2/1985  Suzuki et al. .......... 428/13
4,801,495  1/1989  Vander Hoevan ........ 428/542.2
4,952,462  8/1990  Bright .................. 428/542.2

FOREIGN PATENT DOCUMENTS 0121323  10/1984  European Pat. Off. .
53-134857 11/1978  Japan .
60-193637 10/1985  Japan .
2229965  10/1990  United Kingdom .

Primary Examiner—Donald J. Loney
Attorney, Agent, or Firm—Parkhurst, Wendel & Rossi

[57] ABSTRACT

A decorative sheet having a first substrate sheet 11 formed of a transparent plastic material, in one or both of the surfaces of which all or a part of a pattern-printed layer 2 is embedded, a laminated sheet formed by laminating a second substrate sheet 12 formed of a transparent plastic material on one surface of the abovementioned sheet, or a laminated sheet formed by laminating a third substrate sheet, 13 formed of a plastic material having a concealing effect on the above-mentioned sheet or laminated sheet. This decorative sheet has an excellent three-dimensional effect.

4 Claims, 3 Drawing Sheets

DECORATIVE SHEET AND PROCESS FOR PREPARATION THEREOF

TECHNICAL FIELD

The present invention relates to a decorative sheet having a three-dimensional effect, and a process for the preparation thereof.

BACKGROUND ART

A decorative sheet most popularly used for the production of furniture and construction materials is a laminate of a pattern-printed plastic sheet and a transparent plastic sheet This decorative sheet is poor in three-dimensional effect and is inevitably cheap in appearance.

As decorative sheets having a three-dimensional effect, there are known a sheet formed by pressing resin chips and a sheet obtained by extruding a resin through many nozzles, solidifying the extrudate and slicing the solid. However, these decorative sheets are defective in that the designs that can be manifested are restricted and mass production of sheets having the same design is difficult.

DISCLOSURE OF THE INVENTION

It is an object of the present invention to provide a decorative sheet having a three-dimensional beautiful design and a process for the preparation thereof.

Figure 1:
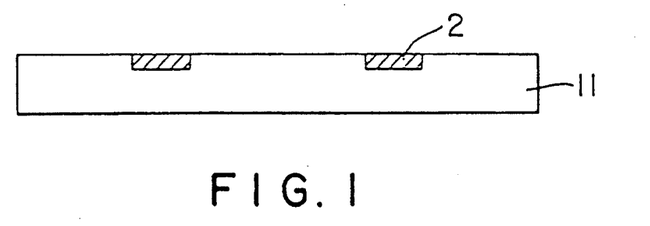
FIGS. 1 through 4 are sectional diagrams illustrating basic embodiments of the decorative sheet of the present invention.
Figure 2:
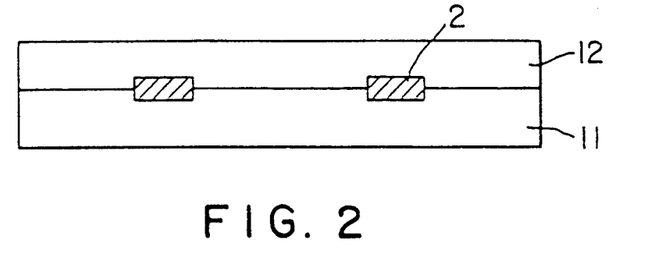
Figure 3:
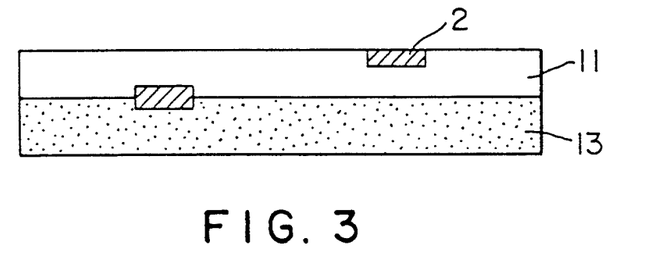
Figure 4:
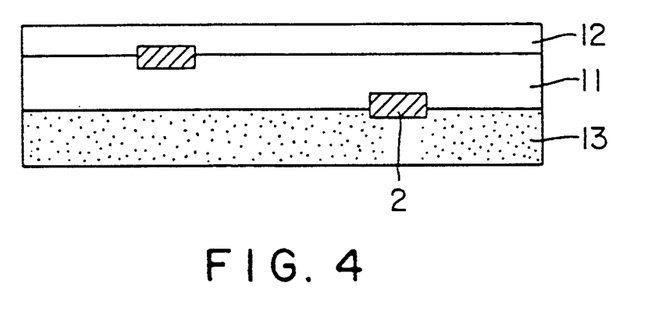

Typical fundamental embodiments of the decorative sheet of the present invention are shown in FIGS. 1 through 4. Namely, the decorative sheet of the present invention includes a sheet comprising a transparent plastic first substrate sheet 11 and a pattern-printed layer 2 partially or wholly embedded in one or both of the surfaces of the first substrate sheet 11 (FIG. 1), a laminate sheet formed by laminating a transparent plastic second substrate sheet on one surface of the above-mentioned sheet (FIG. 2), and a sheet formed by laminating a plastic third substrate sheet 13 having a concealing effect on one surface of the above-mentioned sheet or laminate sheet (FIG. 3 or 4).

BEST MODE FOR CARRYING OUT THE INVENTION

Typical basic embodiments of the decorative sheet of the present invention are shown in FIGS. 1 through 4. Namely, the decorative sheet of the present invention includes a sheet comprising a transparent plastic first substrate sheet 11 and a pattern-printed layer 2 partially or wholly embedded in one or both of the surfaces of the first substrate sheet 11 (FIG. 1), a laminate sheet formed by laminating a transparent plastic second substrate on one surface of the abovementioned sheet (FIG. 2), and a sheet formed by laminating a plastic third substrate sheet 13 having a concealing effect on one surface of the above-mentioned sheet or laminate sheet (FIG. 3 or 4).

In the present invention, by laminating the second substrate sheet or the third substrate sheet on the surface, in which the pattern-printed layer of the first substrate sheet is partially embedded, a part of the pattern-printed layer is embedded in not only the first substrate layer but also the second or third substrate sheet.

As pointed out hereinbefore, a transparent plastic sheet can be used as the first and second substrate sheets. The term "transparent" used for the plastic sheet is meant not only "colorless transparent" but also "colored transparent", and so-called "delustered transparent" sheet which is formed by adding a delustering agent to deluster the surface. Furthermore, a glittering pigment described hereinafter can be incorporated into the plastic material, so far as the transparency is not degraded.

Sheets of the same kind can be used for the first and second substrate sheets, or sheets differing in the material or color can be used for the first and second substrate sheets.

The concealing effect mentioned above can be imparted to the third substrate sheet by kneading a pigment having a concealing effect into a sheet-forming material and making a sheet from the kneaded material, or by printing the substrate sheet. Titanium dioxide and carbon black can be mentioned as typical examples of pigments having a concealing effect, and an appropriate pigment is used according to the desired color of the product sheet. Glittering pigments such as titanium-coated mica, natural pearl foil, inorganic lead type artificial pearl, metal powder and a crushed piece of a metal-vacuum-deposited plastic film can be used.

As typical instances of the plastic material used for the first, second and third substrate sheets, there can be mentioned cellulose resins such as cellophane and an acetate resin, polyolefin resins such as polyethylene, polypropylene and polymethylpentene, polyester resins such as polyethylene terephthalate and polybutylene terephthalate, vinyl polymers such as polyvinyl chloride, polyvinylidene chloride and a vinyl chloride/vinyl acetate copolymer, styrene resins such as polystyrene and an AS resin, polycarbonate, polyvinyl alcohol, polyamides such as nylon 6 and nylon 66, polyacrylate, polyimide and polyether ether ketone. In view of the workability, flame retardance and cost polyvinyl chloride is preferably used.

In view of the strength and the easiness of post working after the preparation, it is preferred that the thickness of each substrate sheet be 0.05 to 1.0 mm. In view of the easiness of embedment of the pattern-printed layer, it is preferred that the first through third substrate sheets be composed of a thermoplastic resin as mentioned above. If such physical properties as surface strength and chemical resistance are required for the substrate sheets, a thermosetting resin or an ionizing radiation-curable resin can be used. Thermosetting or ionizing radiation-curable sheets are used as the first through third substrate sheets in which a pattern-printed layer is to be embedded, the pattern is embedded in the state where the substrate sheets have a higher hardness and a lower compressibility than those of the pattern ink layer, and the sheets are cured by heat or an ionizing radiation. In this case, different curing means are adopted for curing the ink and the sheets, respectively, so that the substrate sheets are not cured by the curing means for the ink. For example, the ink is cured by an ionizing radiation and the substrate sheets are cured by heat. A sheet of a polyurethane, an epoxy resin, a melamine resin or an unsaturated polyester resin is preferably used as the heat-curable sheet.

As the ionizing radiation-curable sheet, there can be used an ultraviolet ray-curable resin comprising 100 parts by weight of a thermoplastic resin such as polyvinyl chloride, an acrylic resin or a thermoplastic resin and the following components incorporated therein:

(a) 10 to 50 parts by weight of a curable resin such as an unsaturated polyester resin, a spiran resin, a urethane resin, an acrylic resin, an epoxy resin, an epoxy acrylate resin or a diallyl phthalate resin or a highly functional polymer constituting such a curable resin;

(b) up to 30 parts by weight of a plasticizer, for example, an acrylic acid ester such as allyl acrylate or allyl methacrylate, or a phthalic acid ester such as dioctyl phthaltate or dibutyl phthalate, according to need;

(c) a small amount of a reaction initiator such as benzoyl peroxide or azonisisobutyronitrile according to need;

(d) 0.5 to 5 parts by weight of a photosensitizer such as a benzoilin alkyl ether or benzophenone; and (e) a small amount of a catalyst such as a tertiary amine or an organic metal compound or a stabilizer such as a metal salt of stearic acid.

As the ionizing radiation-curable resin, there can be used the following resins (1) and (2).

(1) Polymers having a glass transition temperature of 0° to 250° C., which have a radical polymerizable unsaturated group.

More specifically, there can be mentioned polymers formed by homopolymerizing or copolymerizing the following compounds (i) through (viii), into which a radical-polymerizable unsaturated group is introduced by any of methods (a) through (d) described below.

(i) A hydroxyl group-containing monomer such as N-methylol (meth)acrylamide, 2-hydroxyethyl (meth)acrylate, 2-hydroxybutyl (meth)acrylate or 2-hydroxy-3-phenoxypropyl (meth)acrylate.

(ii) A carboxyl group-containing monomer such as (meth)acrylic acid or (meth)acryloyloxyethyl monosuccinate.

(iii) An epoxy group-containing monomer such as glycidyl (meth)acrylate.

(iv) An aziridinyl group-containing monomer such as 2-aziridinylethyl (meth)acrylate and allyl 2-aziridinylpropionate.

(v) An amino group-containing monomer such as (meth)acrylamide, diacetone (meth)acrylamide, dimethylaminoethyl (meth)acrylate or diethylaminoethyl (meth)acrylate.

(vi) A sulfone group-containing monomer such as 2-(meth)acrylamido-2-methylpropane-sulfonic acid.

(vii) An isocyanate group-containing monomer, for example, an adduct of a diisocyanate and a radical-polymerizable monomer having an active hydrogen atom, such as a 1 mole/1 mole adduct of 2, 4-toluene diisocyanate and 2-hydroxyethyl (meth)acrylate.

(viii) A product obtained by copolymerizing a compound as mentioned above with a copolymerizable monomer as mentioned below for adjusting the glass transition point of the above-mentioned copolymer or adjusting the physical properties of the cured film.

As the copolymerizable monomer, there can be mentioned, for example, methyl (meth)acrylate, ethyl (meth)acrylate, propyl (meth)acrylate, butyl (meth)acrylate, isobutyl (meth)acrylate, t-butyl (meth)acrylate, isoamyl (meth)acrylate, cyclohexyl (meth)acrylate and 2-ethylhexyl (meth)acrylate.

An ultraviolet ray- or electron beam-curable resin can be obtained by introducing a radical-polymerizable unsaturated group by reacting a polymer as mentioned above according to any of methods (a) through (d) described below.

(a) A homopolymer or copolymer of a hydroxyl group-containing monomer is condensed with a hydroxyl group-containing monomer as mentioned above.

(b) A homopolymer or copolymer of a monomer containing a carboxyl group or sulfone group is condensed with a hydroxyl group-containing monomer as mentioned above.

(c) A homopolymer or copolymer of a monomer containing an epoxy group, isocyanate group or aziridinyl group is subjected to addition reaction with a hydroxyl group- or carboxyl group-containing monomer as mentioned above.

(d) A homopolymer or copolymer of a monomer containing a hydroxyl group or carboxyl group is subjected to addition reaction with a monomer containing an epoxy group or aziridinyl group or a 1 mole/1 mole adduct of an isocyanate compound and a hydroxyl groupcontaining acrylic acid ester monomer (2) Compounds having a melting point of room temperature (20° C.) to 250° C. and a radical-polymerizable unsaturated group.

As specific examples, there can be mentioned stearyl (meth)acrylate, triacryl isocyanurate, cyclohexanediol di(meth)acrylate and spiroglycol di(meth)acrylate.

A mixture of the compounds (1) and (2) can be used, and a radical-polymerizable unsaturated monomer can be added to the compounds (1) and (2). This monomer exerts functions of improving the crosslinking density by irradiation with an ionizing radiation and improving the heat resistance. In addition to the above-mentioned monomers, there can be used ethylene glycol di(meth)acrylate, polyethylene glycol di(meth)acrylate, hexanediol di(meth)acrylate, trimethylolpropane di- or tri-(meth)acrylate, pentaerythritol tri-or tetra(meth)acrylate, dipentaerythritol hexa(meth)acrylate, (poly)ethylene glycol diglycidyl ether di(meth)acrylate, (poly)-propylene glycol diglycidyl ether di(meth)acrylate and sorbitol tetraglycidyl ether tetra(meth)acrylate. The monomer is preferably used in an amount of 0.1 to 100 parts by weight per 100 parts by weight of the solid of the monomer/copolymer mixture.

The foregoing composition can be cured with electron beams, and in the case where the curing is effected with ultraviolet rays, a compound capable of generating a radical under irradiation with ultraviolet rays, for example, benzoquinone, benzoin, a benzoin ether such as benzoin methyl ether, a acetophenone halide or biacetyl, is preferably added.

Each of these ionizing radiation-curable resins can be formed into a sheet by the known calender method or casting method.

An appropriate ink is used for the pattern-printed layer according to the sheet used For example, there can be used a delustered transparent or colored transparent ink and a glittering pigment-containing ink. A glittering pigment as mentioned above can be used.

If the third substrate sheet to which a concealing effect is given by using a glittering pigment is used in combination with a pattern-printed layer having a glitter different from that of the third substrate sheet, a decorative sheet having an enhanced three-dimensional effect is obtained In the embodiment where the first or second substrate sheet is disposed between the pattern-printed layer and the third substrate sheet as shown in FIG. 3, if the pattern-printed layer is formed by using an ink having a hiding power, for example, an ink comprising titanium oxide or carbon black, a shade is formed on the third substrate sheet and a decorative sheet having a deep appearance can be obtained.

Transparent inks having the same color can be used for the pattern-printed layer and the first or second substrate sheet. If the refractive index of the substrate sheet is different from that of the pattern-printed layer, a three-dimensional effect can be manifested.

In order to attain a sufficient effect by embedding, the thickness of the pattern-printed layer is preferably selected within the range of 20 to 150 $\mu$, especially 50 to 100 $\mu m$.

In order to prevent collapsing or sagging of the printed layer upon the preparation of the decorative sheet, it is preferred that the compressibility of the pattern-printed layer be lower than that of each substrate sheet. An ink used for this pattern-printed layer is one comprising as a vehicle a curable or thermoplastic resin having a high glass transition point or comprising a non-compressible filler incorporated therein.

As the curable resin, there can be mentioned a polysiloxane resin, an ionizing radiation-curable resin and a two-pack type curable resin such as a urethane, epoxy, melamine or unsaturated polyester resin.

As the non-compressible filler, there can be mentioned pulverization products of curable resins such as a phenolic resin, a urea-melamine resin, a polyester resin, a polyurethane resin and an epoxy resin, and known fillers such as aluminum hydroxide, magnesium carbonate, potassium sulfate, barium sulfate, calcium carbonate, alumina, stone powder, FRR waste, siliceous sand, glass fiber, clay, kaolin and talc.

The typical processes for the preparation of decorative sheets of the above-mentioned basic embodiments will now be described.

The process of the present invention for the preparation of a decorative sheet as shown in FIG. 1 comprises the following steps:

1) performing buildup printing of one or both of surfaces of a first substrate sheet formed of a transparent plastic material with an ink comprising a curable resin as the vehicle to form a pattern-printed layer;

2) curing the pattern-printed layer; and 3) heat-compressing the first substrate sheet to embed the pattern-printed layer in the first substrate sheet.

The process of the present invention for the preparation of a decorative sheet as shown in FIG. 2, 3 or 4 comprises the following steps:

1) performing buildup printing of one or both of surfaces of a first substrate sheet formed of a transparent plastic material with an ink comprising a curable resin as the vehicle to form a pattern-printed layer;

2) curing the pattern-printed layer; and 3A) piling a second substrate sheet formed of a transparent plastic material and/or a third substrate sheet formed of a plastic material having a concealing effect on the first substrate sheet and heat-compressing the assembly to laminate the substrate sheets so that the pattern-printed layer is embedded in one or two or more of the substrate sheets.

A decorative sheet as shown in FIG. 3 can also be prepared by adopting, instead of the above-mentioned process, the preparation process comprising the following steps:

1B) performing buildup printing of one surface of a third substrate sheet with an ink comprising a curable resin as the vehicle to form a pattern-printed layer;

2) curing the pattern-printed layer; and 3B) piling a first substrate sheet on the printed surface of the third substrate sheet and heat-compressing the assembly to embed the pattern-printed layer in the first substrate sheet and/or the third substrate sheet.

In each of the above-mentioned preparation processes, if both the substrate sheets having the pattern-printed layer interposed therebetween have the same hardness when the respective substrate sheets are laminated with the pattern-printed layer interposed therebetween, there can be obtained a decorative sheet in which the printed layer is located at the middle position between both the substrate sheets, as shown in FIG. 2. If both the substrate sheets having the printed layer interposed therebetween are different in the hardness, there can be obtained a decorative sheet in which the printed layer is biased toward the softer substrate sheet, as shown in FIG. 4.

Formation of the pattern can be accomplished by the known method capable of performing buildup printing, such as gravure printing, offset gravure printing, silk screen printing, offset printing, electrostatic printing or jet printing. Gravure printing is preferably adopted because a beautiful pattern can be formed even if the surface of a sheet to be printed is rough to a certain degree. A pattern of a fretwork or polka dots, an abstract pattern or a natural pattern such as a rift pattern or a grain pattern can be arbitrarily selected as the pattern, and various letters or symbols can be added, if desired.

In each of the foregoing processes, a curable resin as mentioned above can be used as the ink vehicle Needless to say, an appropriate curing means is selected according to the kind of the resin used at the step of curing the pattern-printed layer. For example, when an ionizing radiation-curable resin is used, curing is effected by irradiation with an ionizing radiation.

In each of the foregoing processes, the patternprinted layer is formed by an ink comprising a curable resin as the vehicle. However, of course, an ink comprising a resin having a high glass transition point as the vehicle or an ink comprising a non-compressible fill incorporated therein can be used. In this case, the step of curing the printed layer is not necessary.

Figure 5:
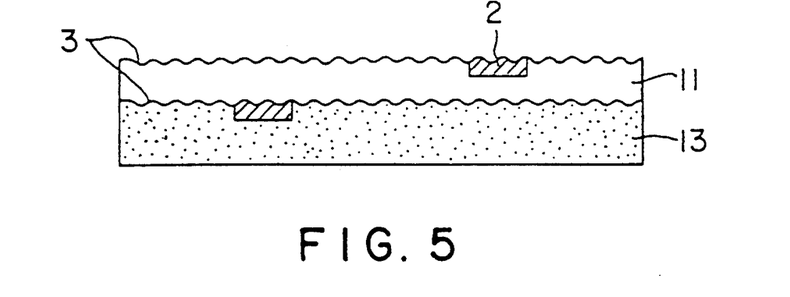
FIGS. 5 through 7 are sectional views illustrating preferred embodiments of the decorative sheets of the present invention.

Lamination of the respective sheets conducted simultaneously with embedment of the pattern-printed layer is accomplished only by the application of pressure. However, it is preferred that the adhesiveness between the pattern-printed layer and the substrate sheet or between the substrate sheets be increased. In the case where embossing is carried out simultaneous with the lamination, in view of the embossing adaptability and the pattern-printed layer-embedding effect, it is preferred that the lamination be effected by applying heat and pressure simultaneously to the respective substrate sheets. More specifically, the lamination is effected by using a press comprising a mirror surface plate or by a doubling operation utilizing heat and pressure. According to a preferred embodiment, in the decorative sheet of the present invention, an embossed pattern 3 is formed on the surface of the decorative sheet and/or between the substrate sheets, as shown in FIG. 5.

The embossed pattern 3 can be formed on the entire surface including the pattern-printed layer or on the portion of the surface excluding the pattern-printed layer.

The kind of the embossed pattern is not particularly critical but an optional pattern can be adopted. For example, there can be adopted an aggregate of patterns comprising groups of parallel straight lines or curves and a closed boundary line enclosing these lines or curves. It is preferred that the difference of the direction of the parallel straight lines or curves between two groups adjacent to each other through the boundary line be at least 5° and the depth and interval of the lines be 0.1 to 10 μm. The design of this pattern type is characterized in that the gloss of each closed region is changed according to the visual angle. Because all of the directions of respective adjacent line groups having boundary line in common are different from one another, it is necessary according to the "theorem of four-colour problem" of the phase geometry that there should be present at least 4 kinds of direction differences.

A decorative sheet having an embossed pattern between sheets is prepared, for example, through the following steps:

1C) performing buildup printing on one surface of a second substrate sheet or third substrate sheet with an ink comprising a curable resin as the vehicle to form a pattern-printed layer;

2C) curing the pattern-printed layer and heat-compressing the substrate sheet by using an embossing plate to embed the pattern-printed layer in the second or third substrate sheet and form an embossed pattern on the printed surface; and 3C) piling a first substrate sheet on the printed surface of the second or third substrate sheet and heat-compressing the assembly to effect lamination.

At the laminating step (step 3A), 3B) or 3C)] of each of the above-mentioned preparation processes, if the lamination of the substrate sheets by heat compression is carried out by using an embossing plate, a decorative sheet having an embossed surface can be obtained.

Figure 6:
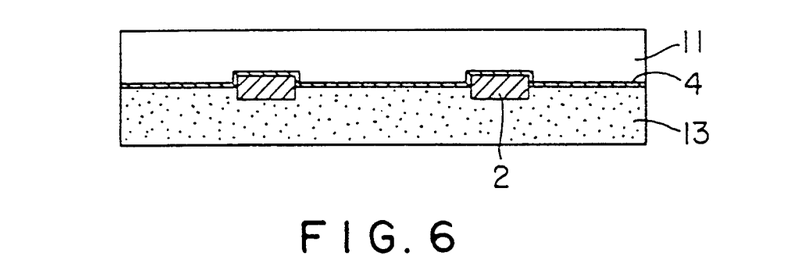

Of the above-mentioned decorative sheets of the present invention, in the embodiment where a pattern-printed layer is formed between substrate sheets, it is preferred that a primer layer 4 be disposed between the sheets to tightly bond the respective layers to each other, as shown in FIG. 6. This embodiment is especially recommended when a pattern is printed which has poor bondability to the substrate sheets (thermoplastic sheets are mainly used as pointed out hereinbefore) constituting the decorative sheet.

The requirement that the preparation should be easy and cause no deformation of the pattern-printed layer, the pattern-printed layer should be sufficiently embedded in respective substrate sheets to produce a beautiful design and the respective layers should be tightly bonded to one another is satisfied by the following decorative sheet. Namely, the above requirement is satisfied by a decorative sheet in which a pattern-printed layer formed by an ink comprising an ionizing radiation-curable resin or its mixture with an ionizing radiation-uncurable resin as the vehicle and a primer layer is formed by an ionizing radiation-uncurable resin or its mixture with an ionizing radiation-curable resin.

The process of the present invention for the preparation of this decorative sheet comprises the following steps:

1D) performing buildup printing of one or both of surfaces of a first substrate sheet with an ink comprising an ionizing radiation-curable resin or its mixture with an ionizing radiation-uncurable resin as the vehicle to form a pattern-printed layer;

2-1) semi-curing the pattern-printed layer by irradiation with an ionizing radiation;

2-2) coating an ionizing radiation-uncurable resin or its mixture with an ionizing radiation-curable resin on the semi-cured pattern-printed layer to form a primer layer;

2-3) irradiating the assembly with an ionizing radiation again to cure completely the pattern-printed layer; and 3D) piling a second substrate sheet and/or a third substrate sheet on the first substrate sheet and heat-compressing the assembly to embed pattern-printed layer in one or two or more of the substrate sheets.

Figure 8:
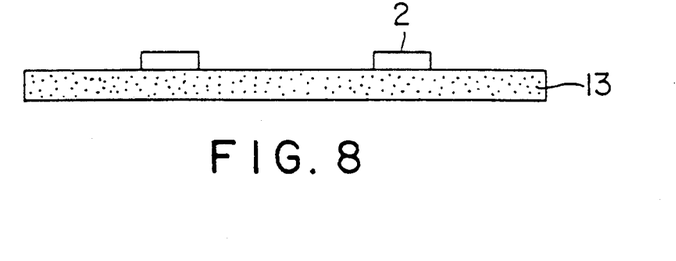
FIGS. 8 through 12 illustrate the preparation process of the present invention, which are sectional views, similar to FIGS. 1 through 4, showing semi-manufactured products after the respective steps.
Figure 9:
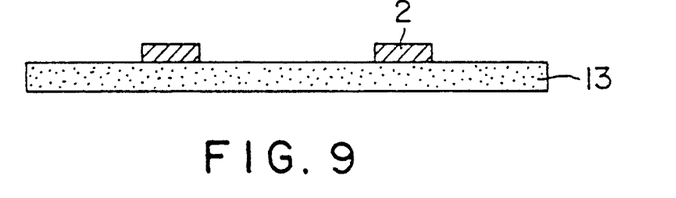
Figure 10:
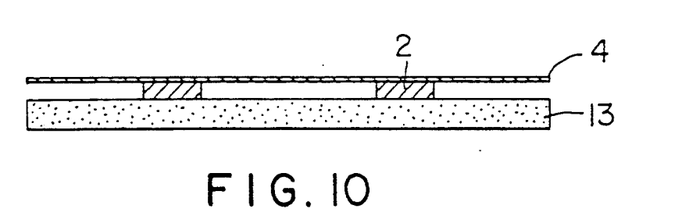
Figure 11:
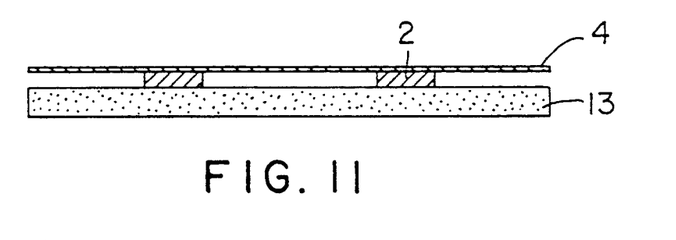
Figure 12:
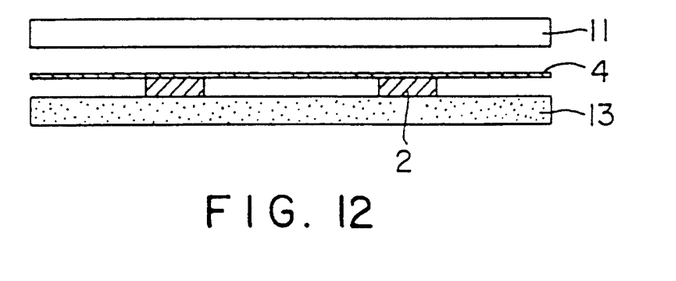

As is seen from FIGS. 8 through 12 showing intermediate products after respective steps, another preparation process of the present invention comprises the following steps:

1E) performing buildup printing of one surface of a third substrate sheet 13 with an ink comprising an ionizing radiation-curable resin or its mixture with an ionizing radiation-uncurable resin as the vehicle to form a pattern-printed layer 2 (FIG. 8);

2-1) semi-curing the pattern-printed layer 2 by irradiation with an ionizing radiation (FIG. 9);

2-2) coating an ionizing radiation-uncurable resin or its mixture with an ionizing radiation-curable resin on the semi-cured pattern-printed layer 2 to form a primer layer 4 (FIG. 10);

2-3) irradiating the assembly with an ionizing radiation again to cure completely the pattern-printed layer 2 (FIG. 11); and 3E) piling a first substrate sheet 11 on the printed surface of the third substrate sheet 13 (FIG. 12) and heat-compressing the assembly to effect lamination so that the pattern-printed layer 2 is embedded.

A decorative sheet prepared according to this process is shown in FIG. 6.

In the foregoing processes, an ionizing radiation-curable resin or its mixture with an ionizing radiation-curable resin is used as the ink vehicle. When a mixture containing the uncurable resin in a larger amount is used as the vehicle, it becomes difficult to embed the pattern-printed layer in the respective substrate sheets while maintaining the three-dimensional shape in the pattern-printed later, and therefore, it is preferred that the amount of the uncurable resin be adjusted to up to 70% by weight.

As the ionizing radiation-curable resin, there can be used a composition comprising an oligomer of epoxy acrylate, urethane acrylate, and acrylic acid-modified alkyd or an acrylic acid-modified polyester and a monomer such as neopentyl glycol diacrylate, pentaerythritol triacrylate, trimethylolpropane triacrylate or trimethylolpropane trimethacrylate incorporated for adjusting the crosslinked structure or the viscosity. This resin can be sufficiently cured by irradiation with electron beams. In the case where curing is effected by irradiation with ultraviolet rays, a photo-polymerization initiator of the benzoin, acetophenone, benzylketal or ketone/amine type is generally added.

As typical instances of the ionizing radiation, there can be mentioned electron beams and ultraviolet rays.

Electron beams can be generated from various electron beam accelerators, and electron beams having an energy of 50 to 1000 KeV, preferably 100 to 300 KeV, are used. Ultraviolet rays generated from a high-pressure mercury lamp or other ultraviolet ray source are used.

As examples of the resin not cured under irradiation with an ionizing radiation, there can be mentioned cellulose derivatives such as ethyl cellulose, ethylhydoxyethyl cellulose, cellulose acetate propionate and acetyl cellulose, styrene resin such as polystyrene and poly-α-methylstyrene, (meth)acrylic acid resins such as polymethy (meth)acrylate, polyethyl (meth)acrylate and polybutyl (meth)acrylate, rosin ester resins such as rosin, rosin-modified maleic acid resins, rosin-modified phenolic resins and polymerized rosin, and polyvinyl acetate, coumarone resins, vinyltoluene resins, polyvinyl chloride, vinyl chloride/vinyl acetate copolymers, polyesters, polyurethanes and butyral resins. Mixtures of two or more of these resins can also be used.

The primer is selected from ionizing radiationuncurable resins in view of the respective substrate sheets and the vehicle of the printing ink. For example, in the case where each of the two substrate sheets having the pattern printed layer interposed therebetween is a sheet of polyvinyl chloride and the vehicle of the printing ink is a resin mixture containing polyvinyl chloride, the primer is preferably composed of polyvinyl chloride or a resin mixture comprising polyvinyl chloride as the main component.

A mixture comprising a resin curable under irradiation with an ionizing radiation and a resin not cured under irradiation with an ionizing radiation can be used as the primer, but if the amount of the curable resin is large, the adhesive force between the decorative sheet layers if weakened, and therefore, the amount of the curable resin is reduced.

Figure 7:
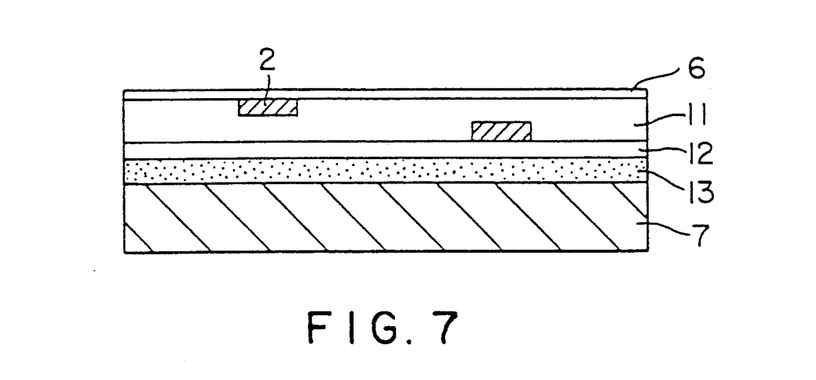

A protecting layer 6 or a backing layer 7 can be optionally formed according to the intended use, as shown in FIG. 7, or a sticking agent and a release paper can be laminated.

The protecting layer is preferably formed of a colorless transparent or colored transparent resin excellent in the surface properties such as weatherability, abrasion resistance and stain resistance. For example, an ionizing radiation-curable resin, a two-liquid curing type resin, a fluorine resin and a polysiloxane resin are preferably used.

The backing material is used for facilitating the working, reducing the elongation or contraction of the decorative sheet and imparting a desired thickness to the decorative sheet.

The kind of the backing material is not particularly critical, but a composition formed by incorporating a filler such as calcium carbonate into polyvinyl chloride (an inexpensive reclaimed product can be used) or bitumen is preferably used in view of the dimensional stability and heat resistance. If an especially high dimensional safety is required, a composition formed by incorporating a glass fiber can be used. A nonwoven fabric, a glass cloth or other woven fabric can be laminated directly or through the above-mentioned layer. A metal sheet such as an iron sheet or an aluminum sheet or a wood substrate such as a plywood or a particle board can be used as the backing material.

The laminate of the sticking agent and release paper facilitates the working of the decorative sheet in situ.

Known sticking agents and release papers can be used, for example, a sticking agent such as an ethylene/vinyl acetate copolymer or a polyurethane and a silicone release paper can be used.

For the production of a decorative sheet having a protecting layer or a backing material, the protecting layer or sticking material can be formed on a completed decorative sheet, or can be formed at an optional step during the preparation.

The decorative sheet of the present invention is generally used as a surface decorative material for a wall surface or floor in the state bonded to a substrate. Furthermore, there can be adopted a simultaneous injection molding and bonding method, and the decorative sheet is preliminarily molded on a metal mold as required and a resin is cast into the mold to effect integration, whereby a product having a decorative sheet laminated on the surface of a three-dimensional molded article can be obtained.

In the decorative sheet of the present invention, a three-dimensional effect can be manifested by embedding the pattern-printed layer in the substrate sheets. This effect is enhanced by combining the respective substrate sheets and pattern-printed layer appropriately. For example, if the brightness or gloss of the pattern-printed portion is higher than that of the substrate sheet, the pattern is seen as rising. In the reverse case, the pattern is seen as sinking. In the former case, if a transparent substrate sheet (first or second) substrate sheet) is made present as an intermediate layer, the effect is enhanced. If this embedding of the pattern-printed layer is combined with printing of a picture pattern or embossing, a more complicated three-dimensional effect can be attained.

According to the preparation process of the present invention, the above-mentioned decorative sheet can be easily obtained, and furthermore, since the pattern-printed layer is formed by an ink comprising a curable resin as the vehicle, sagging or collapsing of the pattern is not caused.

In the embodiment where a primer layer is formed between substrate sheets having the pattern-printed layer, there is no risk of occurrence of interlaminar peeling in the decorative sheet. Since the same or similar plastic materials are selected for the respective substrate sheets and primer, the adhesive force among them is sufficiently strong. The reason for the occurrence of interlaminar peeling in the decorative sheet is that the adhesive force to the pattern-printed layer is not sufficient. At the point when a pattern is printed on the substrate sheet, the pattern-printed layer is in the semi-cured state, and therefore the pattern-printed layer is tightly bonded to the printed sheet. Accordingly, it is the adhesive force between the sheet to be laminated after the curing of the pattern-printed layer and the pattern-printed layer that is important and should be taken into consideration.

According to the preparation process of the present invention, in the state where the pattern-printed layer is semi-cured, namely in the state where the curing reaction of the ionizing radiation-curable resin, such as crosslinking or polymerization, is not completed but a part of the resin is soluble or wettable with other resin or solvent, the primer is coated. Therefore, permeation or dissolution is caused between the primer layer and the pattern-printed layer and a good bonding is attained between the two layers.

Since the pattern-printed layer is then completely cured and the lamination is effected, the pattern-printed layer can be embedded in the pattern-printed substrate sheet and/or the substrate sheet to be laminated on the pattern without deformation of the pattern. Furthermore, since the sheet to be laminated is tightly bonded to the primer layer as pointed out hereinbefore, the respective layers are tightly bonded to one another in the decorative sheet.

EXAMPLE 1

An abstract pattern was gravure-printed on one surface of a colorless transparent polyvinyl chloride (PVC) sheet having a thickness of 0.3 mm ("W-500" supplied by Riken Vinyl Kogyo) as the first substrate sheet with an ultraviolet ray-curable ink ("Seika Beam P" supplied by Dainichi Seika Kogyo) by using a gravure printing plate having a printing depth of 150 μm so that a margin was left, and the pattern-printed substrate sheet was irradiated with ultraviolet rays (having an intensity of 160 W/cm) for 2 seconds to effect curing.

The so-printed sheet was piled on a gray-colored PVC sheet having a thickness of 0.1 mm and a concealing effect (supplied by Riken Vinyl Kogyo) as the third substrate sheet so the printed surface of the printed sheet was located above. Then, a mirror surface plate was placed on the topmost surface, and the assembly was pressed under a force of 15 kg/cm2 for 15 minutes from below and above by pressing plates heated at 150° C. through cushions. The pressing plates were cooled to 10° to 20° C. while the application of the force was continued, and the pressing plates were then removed. Thus, the pattern-printed layer was embedded in the sheets simultaneously with lamination to obtain a decorative sheet of the present invention.

EXAMPLE 2

In the same manner as described in Example 1, a pattern-printed layer was formed and cured on the same third substrate sheet as used in Example 1. The same first substrate sheet as used in Example 1 was piled on the printed surface, and the assembly was pressed in the same manner as described in Example 1 to embed the pattern-printed layer into the sheets simultaneously with the lamination, whereby a decorative sheet of the present invention was obtained.

EXAMPLE 3

An abstract pattern was gravure-printed on one surface of the same first substrate sheet as used in Example 1 with an ink comprising 100 parts by weight of a PVC type ink (V-12 supplied by Dainichi Seika Kogyo) and 60 parts by weight of calcium carbonate having an average particle size of 30 μ as the non-compressible filler by using a gravure printing plate having a printing depth of 150 μ so that a margin was left.

A composition described below was molded into a sheet having a thickness of 1.5 mm as the backing material by the calender method:
Polyvinyl chloride (reclaimed 100 parts by weight product)
Plasticizer (DOP) 30 parts by weight
Pigment (carbon black) 2 parts by weight
Heat stabilizer (AC-113 supplied 2 parts by weight by Adeca-Argus)

A light-yellow PVC sheet having a thickness of 0.1 mm (supplied by Riken Vinyl Kogyo) as the second substrate sheet and the pattern-printed PVC sheet were piled on the backing material so that the printed surface was located on the inner side. In the same manner as described in Example 1, the assembly was pressed to embed the pattern-printed layer into the sheets simultaneously with the lamination, whereby a decorative sheet of the present invention was obtained.

EXAMPLE 4

In the same manner as described in Example 1, both of surfaces of a colorless transparent PVC sheet having a thickness of 0.3 mm (W-500 supplied by Riken Vinyl Kogyo) as the first substrate sheet were gravure-printed with a pearl pigment-incorporated ultraviolet ray-curable ink (Seika Beam supplied by Dainichi Seika Kogyo) and the ink was cured.

A pearl pigment-incorporated transparent PVC sheet having a thickness of 0.1 mm (supplied by Riken Vinyl Kogyo) as the second substrate sheet and a white PVC sheet having a thickness of 0.5 mm (supplied by Riken Vinyl Kogyo) as the third substrate sheet were piled on the printed sheet. In the same manner as described in Example 1, the assembly was pressed to embed the pattern-printed layer into the sheets simultaneously with the lamination.

A pigment-free ultraviolet ray-curable ink (Seika Beam supplied by Dainichi Seika Kogyo) was coated on the first substrate sheet by a gravure coater, and curing was carried out under the same conditions adopted for curing the pattern-printed layer to form a protecting layer having a thickness of 10 μm, whereby a decorative sheet of the present invention was obtained.

EXAMPLE 5

A sheet having the same layer structure as described in Example 1 was heat-pressed in the same manner as described in Example 1 except that a hairline-shaped embossing plate was used instead of the mirror surface plate, whereby the portion where the pattern-printed layer was not present was embossed.

A vinyl chloride/vinyl acetate copolymer type sticking agent was roll-coated on the surface which had not been embossed, and a release paper was applied to the sticking agent-coated surface to obtain a decorative sheet of the present invention.

EXAMPLE 6

One surface of a colorless transparent PVC sheet having a thickness of 0.3 mm (supplied by Riken Vinyl Kogyo) as the first substrate sheet was gravure-printed with a white ink formed by mixing an ultraviolet ray-curable ink (EXD-1216 supplied by Dainichi Seika Kogyo) and a vinyl choloride type ink (V-12 supplied by Dainichi Seika Kogyo) at a ratio of 95/5 by using the same gravure printing plate as used in Example 1 and the printed surface was irradiated with ultraviolet rays (having an intensity of 80 W/cm) for 1 second to semi-cure the pattern-printed layer. The printed surface of this sheet was solid-printed with a vinyl chloride type ink (V-12 supplied by Dainichi Seika Kogyo) so that the dry thickness was 2μ, and the printed surface was irradiated with ultraviolet rays (having an intensity of 80 W/cm) for 2 seconds to completely cure the pattern-printed layer.

A gray-colored PVC sheet having a thickness of 0.08 mm (supplied by Riken Vinyl Kogyo) as the third substrate sheet and the pattern-printed PVC sheet were piled on the same backing material as used in Example 3 so that the printed surface was located below. The assembly was heat-pressed in the same manner as described in Example 1 to embed the pattern-printed layer into the sheets simultaneously with the lamination.

The obtained decorative sheet was beautiful and had a three-dimensional effect, and the respective layers were tightly bonded to one another and could not be peeled by hand.

INDUSTRIAL APPLICABILITY

The decorative sheet of the present invention has a three-dimensional effect and a beautiful design. A cabinet or furniture prepared by using this decorative sheet has a high-grade feel. The decorative sheet of the present invention on which a backing material is fixed is especially suitable as a floor material.

If a primer layer is disposed between sheets having the pattern-printed layer in the decorative sheet of the present invention, a beautiful design in which the shape of the printed pattern is retained in a good state can be attained, and interlaminar peeling is not substantially caused and the decorative sheet has an excellent durability.

Accordingly, the decorative sheet of the present invention can be applied to furniture and floor materials for which a high durability and an excellent design or appearance are required.

We claim:

1. A process for the preparation of a decorative sheet, which comprises the following steps:
   1) performing buildup printing of at least one surface of a first substrate sheet with an ink comprising an ionizing radiation-curable resin or its mixture with an ionizing radiation-uncurable resin as the vehicle to form a pattern-printed layer;
   2) semi-curing the pattern-printed layer by irradiation with an ionizing radiation;
   3) coating an ionizing radiation-uncurable resin or its mixture with an ionizing radiation-curable resin on the semi-cured pattern-printed layer to form a primer layer;
   4) irradiating the assembly with an ionizing radiation again to cure completely the pattern-printed layer; and
   5) piling a second substrate sheet and/or a third substrate sheet on the first substrate sheet and compressing or heat-compressing the assembly to embed the pattern-printed layer in at least one of the substrate sheets.

2. A process for the preparation of a decorative sheet according to claim 1, wherein a sheet of a heat-curable resin or ionizing radiation-curable resin which is a nonsticky solid even in the uncured state has a higher hardness and a lower compressibility than those of the pattern-printed layer is used as the first, second and third substrate sheets in which the pattern-printed layer is to be embedded, the step 5) is carried out by performing compressing or heat compression in the state where said substrate sheet is uncured and performing lamination to embed the pattern-printed layer, and then, said substrate sheet is cured by application of heat or irradiation with an ionizing radiation.

3. A process for the preparation of a decorative sheet, which comprises the following steps:
   1) performing buildup printing of at least one surface of a first substrate sheet with an ink comprising an ionizing radiation-curable resin or its mixture with an ionizing radiation-uncurable resin as the vehicle to form a pattern-printed layer;
   2) semi-curing the pattern-printed layer by irradiation with an ionizing radiation;
   3) coating an ionizing radiation-uncurable resin or its mixture with an ionizing radiation-curable resin on the semi-cured pattern-printed layer to form a primer layer;
   4) irradiating the assembly with an ionizing radiation again to cure completely the pattern-printed layer; and
   5) piling a second substrate sheet on the printed surface of the first substrate sheet and heat-compressing the assembly to effect lamination so that the pattern-printed layer is embedded.

4. A process for the preparation of a decorative sheet according to claim 3, wherein a sheet of a heat-curable resin or ionizing radiation-curable resin which is a nonsticky solid even in the uncured state has a higher hardness and a lower compressibility than those of the pattern-printed layer is used as one of the first, and second second substrate sheets in which the pattern-printed layer is to be embedded, the step 5) is carried out by performing compression or heat compression in the state where said substrate sheet is uncured and performing lamination to embed the pattern-printed layer, and then, said substrate sheet is cured by application of heat or irradiation with an ionizing radiation.

* * * * *

UNITED STATES PATENT AND TRADEMARK OFFICE
CERTIFICATE OF CORRECTION

PATENT NO. : 5,296,340
DATED : March 22, 1994
INVENTOR(S) : Masaki TSUKADA et al.

It is certified that error appears in the above-indentified patent and that said Letters Patent is hereby corrected as shown below:

Title page: Item [30], line 3, change "1-19929" to --1-199929--.

Signed and Sealed this

Sixth Day of September, 1994

Attest:

BRUCE LEHMAN

*Attesting Officer*     *Commissioner of Patents and Trademarks*